US006470780B1

(12) United States Patent
Benuzzi

(10) Patent No.: US 6,470,780 B1
(45) Date of Patent: Oct. 29, 2002

(54) PANEL TURNING DEVICE

(75) Inventor: Piergiorgio Benuzzi, Bologna (IT)

(73) Assignee: Giben Impianti S.p.A., Pianoro (IT)

( * ) Notice: Subject to any disclaimer, the term of this patent is extended or adjusted under 35 U.S.C. 154(b) by 0 days.

(21) Appl. No.: 09/538,561

(22) Filed: Mar. 29, 2000

(30) Foreign Application Priority Data

May 28, 1999 (IT) ........................................ BO99A0296

(51) Int. Cl.[7] ............................. B26D 7/06; B26D 7/02; B23Q 1/25; B25B 1/22

(52) U.S. Cl. .......................... 83/733; 83/581; 83/468.3; 269/79

(58) Field of Search ................................ 83/733, 468.3, 83/581, 435.12, 435.13, 435.14, 36; 269/79

(56) References Cited

U.S. PATENT DOCUMENTS 2,519,269 A * 8/1950 McCrink ..................... 83/767
5,148,730 A * 9/1992 McCaw ........................ 83/745
5,176,058 A * 1/1993 Skelly .......................... 83/415
5,191,821 A * 3/1993 Metzger, Jr. et al. ..... 83/581 X
5,283,958 A * 2/1994 Chang ................... 83/468.3 X
5,645,548 A * 7/1997 Augsburger ................. 606/87
5,797,307 A * 8/1998 Horton ...................... 83/581 X
5,901,763 A * 5/1999 You .......................... 83/581 X
5,904,084 A * 5/1999 Weston ...................... 83/733 X
6,164,176 A * 12/2000 Larsson ................... 83/435.12

* cited by examiner

*Primary Examiner*—M. Rachuba
*Assistant Examiner*—Jason Prone
(74) *Attorney, Agent, or Firm*—Fay, Sharpe, Fagan, Minnich & McKee, LLP

(57) ABSTRACT

A device for turning panels on machines for processing the panels basically comprises an element for holding a panel to be processed or being processed, located close to a table that supports the panel, and acting on the panel in such a way as to form a pivot in a preset area of the panel, and means for turning the panel about the pivot in such a way as to vary the position of the panel relative to a panel cutting device.

14 Claims, 3 Drawing Sheets

PANEL TURNING DEVICE

BACKGROUND OF THE INVENTION

The present invention relates to a device for turning panels, particularly wooden panels on panel sawing machines.

Panel sawing machines of known type are used to cut panels that vary both in width and length, usually placed one over the other in normally large stacks whose dimensions depend on the size of the panels made by the panel forming machines.

At the present time, panel sawing machines, in their minimum standard configurations, basically comprise: a horizontal table to support the stacks of panels to be cut; a unit for picking up the panels and feeding them, along an axis X (horizontal), towards the end of the table where there is a pressing device which holds down one end of the panel stack. The pickup unit comprises a beam equipped with a plurality of pickup elements, for example of the gripper type, located side by side in a line that is at right angles to the direction of forward (or backward) feed and designed to act upon the rear edge of the panels to be cut.

In the area where the hold-down device is mounted, there is also a motor-driven carriage which mounts a cutting device. The carriage moves in both directions along an axis Y transversal to the panel feed axis X, so as to allow the stack of panels to be scored on the surface, and then cut right through, in the area where it is being held by the hold-down device.

At the end of the panel sawing machine where the saw is located, the stack of panels (or the single panel) is usually fed to the saw by machine operators or by a panel feed station (for example a suction table which picks up the panels from a magazine and places them on the horizontal table from above). After the feed operation or after a first series of cutting operations, it is often necessary to turn the cut panels through a right angle in order to position them (or the remaining portion of them if they have already been cut) in a different configuration so that they can be fed to the saw carriage in accordance with the programmed pattern.

At the present time, the turning operation is performed by hand by machine operators with the aid of low-friction panel supporting means, for example, a plurality of wheels placed side by side in two or more rows and mounted on rotating beams, or an air cushion created by suitable systems located under the horizontal table.

On account of the weight and size of the panels, turning them is a slow and burdensome operation for the machine operators, despite the presence of the low-friction supporting means. As a result, it reduces the overall productivity of the machine.

SUMMARY OF THE INVENTION

The aim of the present invention is to overcome the disadvantages described above by providing a panel turning device for panel sawing machines which is simple, flexible and fast, occupies little space and does not alter the basic structure of the panel sawing machine.

BRIEF DESCRIPTION OF THE DRAWINGS

The technical characteristics of the invention according to the above mentioned aims are described in the claims below and the advantages of the invention will become more apparent from the detailed description which follows, with reference to the accompanying drawings, which illustrate preferred embodiments of the invention and in which:

DESCRIPTION OF THE PREFERRED EMBODIMENTS

Figure 1:
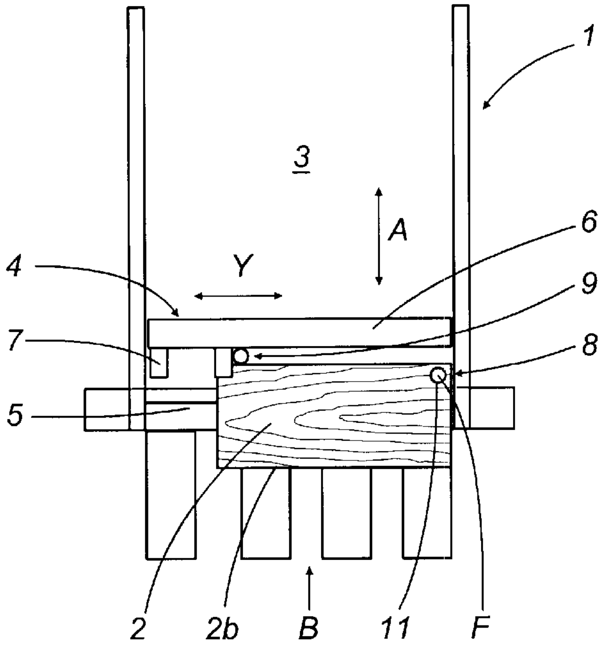
FIGS. 1, 2 and 3 illustrate a first set of panel turning and positioning operations which can be performed by the device made according to the present invention applied to a panel sawing machine; all being shown in schematic top plan views.
Figure 7:
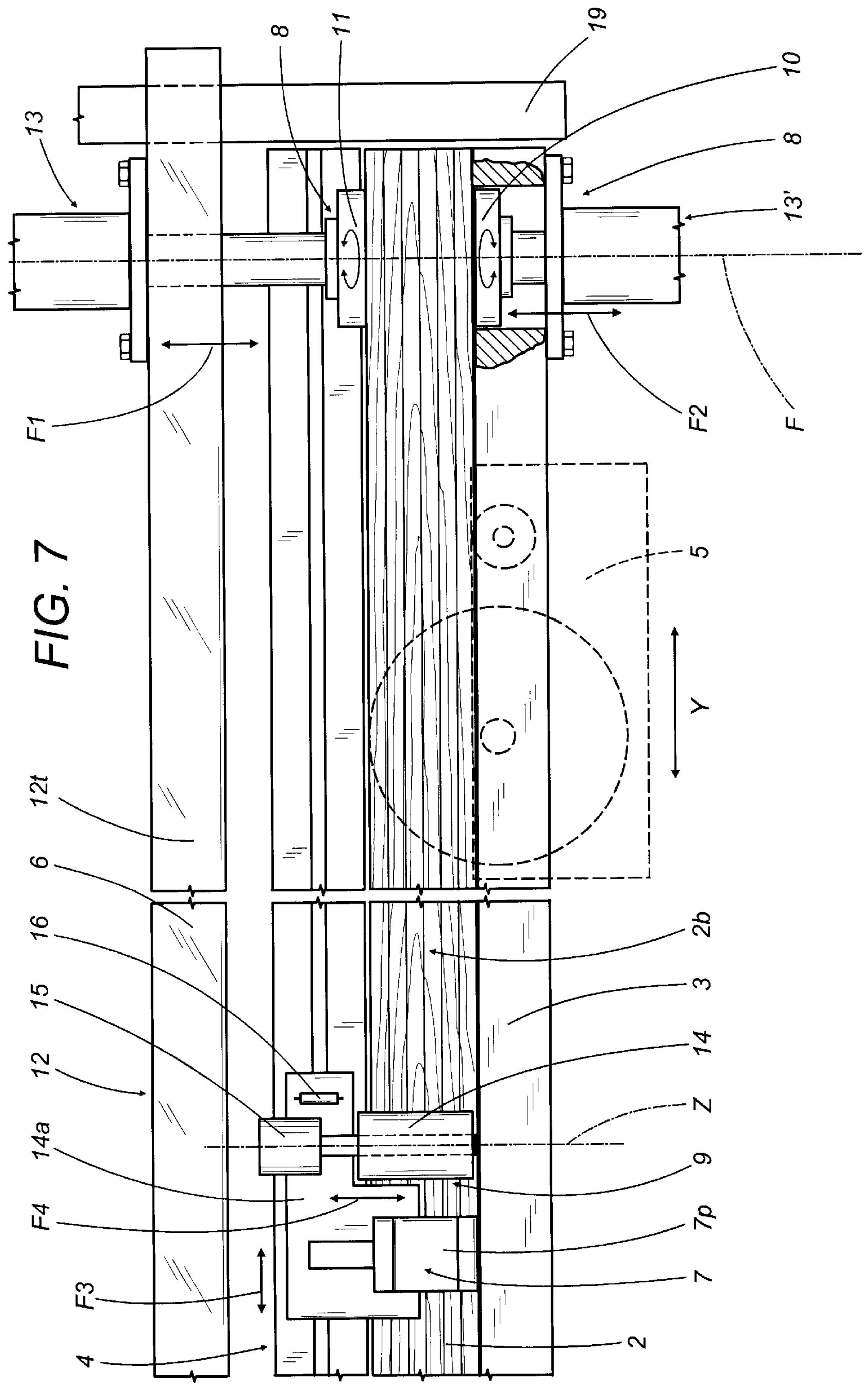
FIG. 7 shows the device disclosed herein in a view from B in FIG. 1, with some parts cut away in order to better illustrate others.

With reference to the accompanying drawings, in particular FIGS. 1 and 7, the device forming the subject-matter of the present invention is used to rotate panels 2 (single or in a stack as shown in FIG. 7).

The device is designed to be applied to a machine 1 for processing panels 2 and basically comprising: a horizontal table 3 to support the panels 2 to be processed; a movable unit 4 designed to move the panels 2 on the table 3 along a feed line in both directions, as indicated by the arrows A, in such a way as to at least feed a cutting device 5 (drawn with a dashed line in FIG. 7, since it is of the known type and hence does not form part of the present invention) which cuts the panels 2 into two or more smaller sub-panels 2*s* by sawing the panels 2 in a direction transverse to direction A (see arrow Y).

The aforementioned unit 4 comprises a crossbar 6 (driven by conventional means, not illustrated) that moves in both directions along the feed line A and that is equipped with one or more elements 7 for holding the panels 2 by a portion of the edge 2*a* at the back end of the panels 2 (relative to the cutting device) in order to move the panels into position and/or hold them in position during the cutting operation and during their forward and backward motion on the table 3.

For convenience, the panels 2 being processed will from here on be referred to in the plural, in stacked form, although the inventive concept applies just as well to a single panel 2.

As shown in all the drawings, the device for turning the panels 2 basically comprises an element 8 for holding the panels 2, located close to the table 3 that supports the panels, and acting on the panels in such a way as to form a pivot F in a preset area of the panels 2, and means 9 for turning the panels 2 about the pivot F in such a way as to vary the position of the panels 2 relative to the cutting device 5.

Looking in more detail, the element 8 that holds the panels 2 is located near the cutting device 5, slides under the table 3, and at a corner of the machine defined by the cutting device 5 and a side fence 19 of the machine itself.

The element 8 comprises a pair of plates 10 and 11 that face one another and that are located close to the working area of the cutting device 5.

The first plate, labelled 10, lies in the same plane as the table 3, while the second plate, labelled 11, can turn freely and is connected to a load-bearing structure 12 located above the table 3. The load-bearing structure 12 is preferably a beam 12*t* on which the presser elements (not illustrated), that hold the panels 2 in place before they are cut, are mounted.

The second plate 11 has means 13 (for example, a cylinder) that move it from an idle position, where the plate 11 is away from the panels 2, and a working position (clearly visible in FIG. 7), where the plate 11 is in contact with an upper corner of the panels 2 and acts in conjunction with the first plate 10 to form the aforementioned pivot point F (see also arrow F1).

Preferably, the first plate 10 comprises a mounting and drive structure similar to that of the plate 11, that is to say, a cylinder 13' that moves it towards and away from the underside of the panels 2 (see arrow F2 in FIG. 7).

The means 9 for turning the panels 2 are connected to the crossbar 6 and can move in both directions along the crossbar as well as being vertically adjustable along a corresponding axis Z in such a way as to enable the panels 2 to turn about the pivot plates 10 and 11 when the crossbar 6 moves along the feed direction A.

As shown in FIG. 7, the pickup elements 7 (of which only one is illustrated for clarity) are adjustably mobile in both directions (see arrows F3) along the crossbar 6. The pickup elements 7 consist of grippers 7*p* that hold the panel edge.

Thanks to this movement of the pickup elements 7, the means 9 for turning the panels 2 may be connected to one of the pickup elements 7 in such a way as to move together with the pickup element in addition to being vertically adjustable along the aforementioned axis Z: thus, the panels 2 are rotated as the crossbar 6 moves along the feed direction A while the means 9 move in the direction Y transversal to the feed direction A.

Looking in more detail, the means 9 for turning the panels 2 comprise a roller 14 that can rotate freely about the axis Z and that is connected to the pickup element 7 by a link plate 14*a*. On the plate 14*a* there are means 15 for driving the roller 14 in both directions (see arrow F4 in FIG. 7) along the axis Z between a raised, idle position, in which the roller 14 is away from the table 3, and a lowered, working position, in which the roller 14 is close to the table 3 and in contact with an edge 2*b* of the stack of panels 2.

Close to the roller 14, there may also be means 16 for detecting the presence of the panels 2 (for example, an optical sensor or a proximity switch) and used to control the relative movement between the roller 14, crossbar 6 and edge 2*b* of the panels 2 being rotated.

Figure 2:
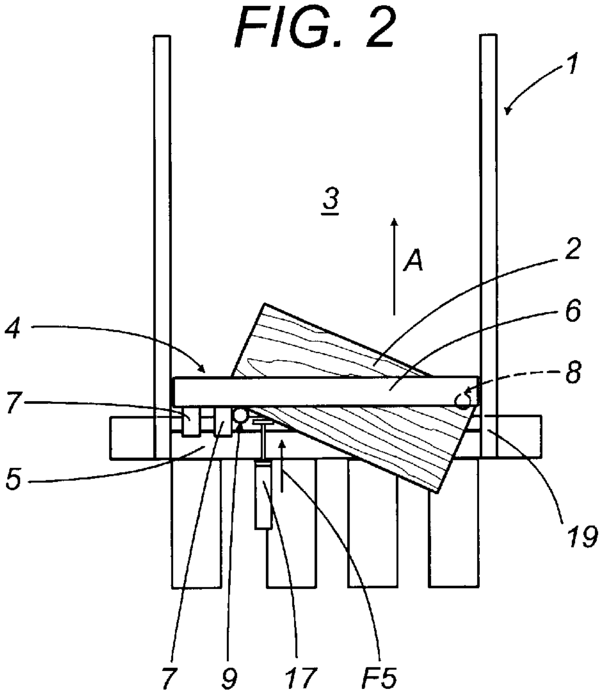

In addition, there may also be first means 17 for pushing the panels 2 (see FIG. 2) located close to the table 3 in the working area of the cutting device 5. The first pusher means 17 (for example, a fluid-driven cylinder) are used to obtain a pre-rotation of the panels 2 by pushing them in a direction parallel to the feed direction A: this provides an area of free access close to the contact edge 2*b* of the panels 2 to allow the roller 14 to move down. The pre-rotation of the panels 2 may also be performed by the machine operators since the panels have to be pushed just a little.

Figure 6:
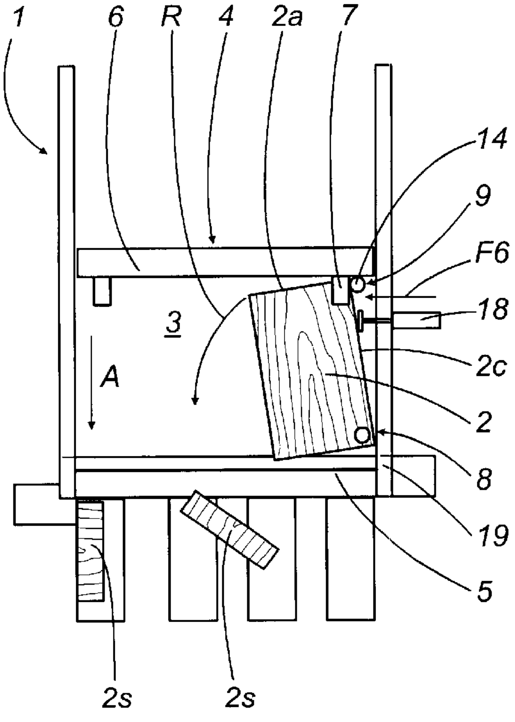

Similarly there may also be second means 18 for pushing the panels 2 (see FIG. 6), located close to the table 3, at the machine'side fence 19 on which they may even be mounted. The second pusher means 18 perform a pre-rotation of the panels 2 in a direction Y transversal to the feed direction A to provide a free access area to enable the roller 14 to move down between the side fence 19 and a contact edge 2*c* of the panels 2. This operation is performed when the panels 2 have to be turned in a direction of rotation R opposite the direction R1 in which they have to be turned by the first pusher means 17.

During use, the device described above operates in the following manner, starting from its configuration at the start of a cutting cycle to be performed on a stack of panels 2.

The panels 2 are placed on the table 3 and fed in until they touch positioning elements (not illustrated) located on the table 3 (see FIG. 1). The plates 10 and 11 now take hold of a corner of the panels 2, after which the pusher means 17 (or, alternatively, the machine operators) push the panels 2 at the end opposite that being held by the plates 10 and 11 for a short distance along the table 3 (see FIG. 2 and arrow F5).

Figure 3:
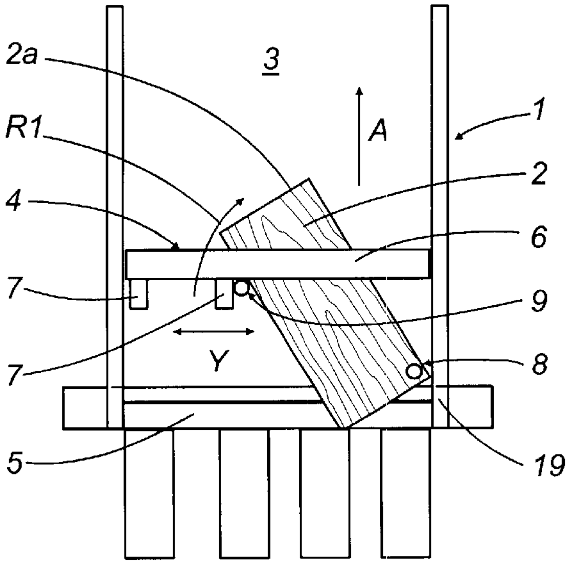
Figure 4:
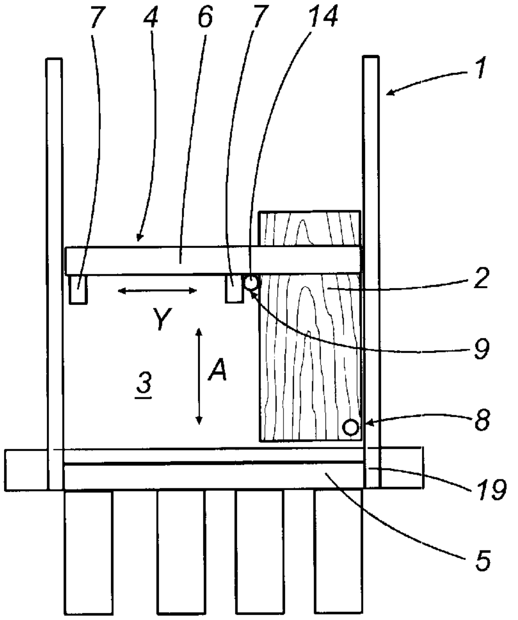
FIGS. 4, 5 and 6 illustrate a second set of panel turning and positioning operations which can be performed by the device made according to the present invention applied to a panel sawing machine; all being shown in schematic top plan views.

Once this has been done, the crossbar 6 is moved along the table 3 until it reaches the edge 2*b* of the panels 2. The idle roller 14 is now lowered and the crossbar 6 starts moving back immediately causing the roller 14 to push the panels 2 in such a way as to turn them in direction R1. The contact between the roller 14 and the edge 2*b* of the panels 2 is detected by the panel 2 detecting means 16 which may require adjustment along the direction Y of the roller 14 in accordance with the movement of the panels 2 (see FIG. 3) during the backward motion of the crossbar 6. Once the panels 2 have been turned, the roller 14 is raised again and the grippers 7*p* grip the rear edge 2*a* of the panels 2 to enable the cutting cycle to begin (see FIG. 4).

Figure 5:
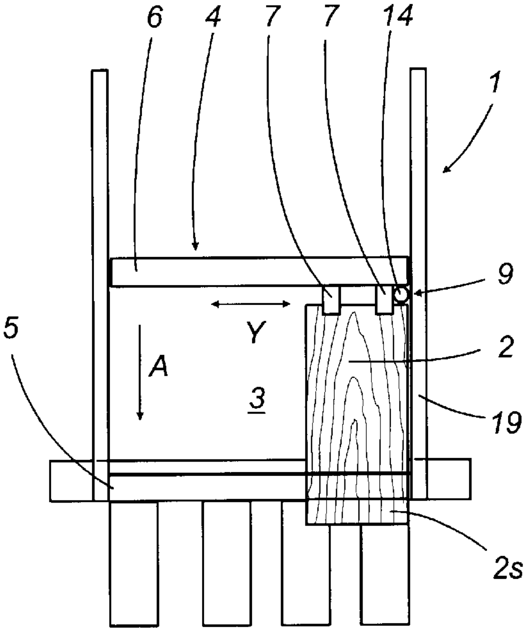

Similarly, the counter-rotation R (see FIGS. 4 to 6), performed when the panels 2 are fed down onto the table 3 from above or upon completion of a first cutting cycle (see FIG. 5), consists in disabling the grippers 7*p*, activating the plates 10 and 11 to hold the corner of the panels 2 and then activating the second pusher means 18 to create the access and downfeed area for the roller 14 by pushing the panels 2 in the direction of the arrow F6. After the roller 14 has been positioned, the crossbar 6 is moved forward in the direction of the cutting device 5 in such a way as to turn the panels in a direction opposite to the previous rotation direction.

A device as described above fully achieves the preset aims thanks to a simple and economical structure that is capable of rapidly positioning the panels on the table and turning them.

This rapid, automatic operation is less fatiguing for the machine operator, reduces the risk of accidents and makes panel positioning an extremely, quick and easy operation, thus appreciably increasing the overall productivity of the panel sawing machine.

The invention described can be subject to modifications and variations without thereby departing from the scope of the inventive concept. For example, instead of the roller, the means for turning the panel might consist of a rotary arm located under the table and equipped with a vertical, articulated push plate protruding from the table (the latter having a semicircular slot to allow its passage). The push plate would enable the panels to be turned in both the rotation directions R and R1 mentioned above.

Moreover, all the details of the invention may be substituted by technically equivalent elements.

What is claimed is:

1. A device for turning panels comprising:

a horizontal table to support at least one panel to be processed;

at least one movable unit designed to move the panel on the table along a feed line in a feed direction and a direction opposite the feed direction to feed a cutting device that cuts the panel into two or more smaller sub-panels by sawing the panel in a direction transverse to the feed direction; the movable unit comprising a crossbar that moves in the feed direction and the direction opposite the feed direction along the feed line and that comprises at least one pickup element for holding the panel by a portion of its rear edge in order to at least one of move the panel into position and hold the panel in position during the cutting operation and during its forward and backward motion on the table;

an element for holding a panel, located close to the table, and acting on the panel to form a pivot in a preset area of the panel; and, means for turning the panel about the pivot to vary a position of the panel relative to the cutting device.

2. The device according to claim 1, wherein the element that holds the panel is located near the cutting device and at a corner of the machine defined by the cutting device and a side fence of the machine.

3. The device according to claim 1, wherein the means for turning the panel are connected to the crossbar and move in both directions along the crossbar as well as being vertically adjustable along a corresponding vertical axis to enable the panel to turn when the crossbar moves along the feed direction or in the direction opposite the feed direction.

4. The device according to clam 1 wherein:

the at least one pickup element is adjustably mobile in both directions along the crossbar;

the means for turning the panel are connected to and move together with the at least one pickup element, and are vertically adjustable along the vertical axis to enable the panel to be rotated as the crossbar moves along the feed direction or along the direction opposite the feed direction while the means for turning the panel move in a direction transverse to the feed direction.

5. The device according to claim 1, wherein the holding element comprises:

a pair of first and second plates that face one another and that are located close to the working area of the cutting device; the first plate lying in the same plane as the table, and the second plate being freely turnable and being connected to a load-bearing structure located above the table; the second plate having means for moving it from an idle position, where the second plate is spaced away from the panel, and a working position, where the second plate is in contact with the panel to form the pivot point.

6. The device according to claim 5, wherein the first plate has means for moving it from an idle position, where the first plate is spaced away from the panel and from the table, to a working position, where the first plate is in contact with the panel.

7. The device according to claim 1, wherein the turning means comprise a roller that rotates freely about an axis of rotation and that is connected to the at least one pickup element; the roller being acted upon by means that move it in both directions along the axis of rotation between a raised, idle position, in which the roller is spaced away from the table, and a lowered, working position, in which the roller is located close to the table and in contact with an edge of the panel.

8. The device according to claim 1, further comprising:

means for detecting the presence of the panel located adjacent the means for turning the panel, said detecting means operable to control relative movement between the turning means and the edge of the panel being rotated.

9. The device according to claim 1, further comprising:

first means, located close to the table adjacent the cutting device, for pushing the panel to obtain a pre-rotation of the panel by pushing it in a direction parallel to the feed direction so as to provide an area of free access for the turning means close to the contact edge of the panel.

10. The device according to claim 1, further comprising:

second means for pushing the panel, located close to the table adjacent a side fence of the machine for performing a pre-rotation of the panel in a direction transverse to the feed direction so as to provide a free access area to enable the turning means to move between the side fence and a contact edge of the panel.

11. The device according to claim 4, wherein the turning means comprise a roller that rotates freely about an axis of rotation and that is connected to the at least one pickup element; the roller being acted upon by means that move it in both directions along the axis of rotation between a raised, idle position, in which the roller is spaced away from the table, and a lowered, working position, in which the roller is located dose to the table and in contact with an edge of the panel.

12. A device for handling a stack of at least one wood panel, said device comprising:

a support table for supporting the stack;

means for moving the stack on the support table in first and second opposite directions along a feed path, said means for moving the stack comprising a crossbar that moves in the first and second directions along the feed path;

means for selectively engaging a select portion of the stack to define a pivot axis about which the stack pivots relative to the support table; and, a panel turning member connected to the crossbar and movable on the crossbar in third and fourth opposite directions that are transverse relative to the feed path, said panel turning member engaging an edge of the stack and pivoting the stack about the pivot axis when said means for engaging are operative to engage the select portion of the stack to define said pivot axis.

13. The device as set forth in claim 12, wherein said panel turning member is a freely rotatable roller.

14. The device as set forth in claim 13, wherein said roller is rotatable about a vertical axis and is movable vertically along said vertical axis between a first position where said roller is spaced vertically from said stack and a second position where said roller is vertically aligned with said stack.

* * * * *